ORTHOGONAL MODE SWITCHING TRANSFORMER

Filed July 1, 1965

INVENTORS
JOHN L. ANDERSON
HANS-OTTO G. LEILICH
BY W. S. Robertson
ATTORNEY 3,436,747

ORTHOGONAL MODE SWITCHING TRANSFORMER

John L. Anderson and Hans-Otto G. Leilich, Poughkeepsie, N.Y., assignors to International Business Machines Corporation, Armonk, N.Y., a corporation of New York Filed July 1, 1965, Ser. No. 468,901
Int. Cl. G11b 5/00
U.S. Cl. 340—174 8 Claims

ABSTRACT OF THE DISCLOSURE

A controlled transformer particularly adapted for flat memory arrays is provided by a chain like magnetic film structure coupling flat, apertured, conductors connected as primary and secondary conductors and a third conductor positioned through the chain aperture and connected to provide a current coincident with a primary conductor current for presetting one of an array of such transformers and then operating the preset transformer to provide a current in its secondary conductor.

*Introduction*

An introductory description of a known magnetic memory that uses orthogonal switching will be helpful for understanding the objects and the general features of the invention and the terminology that will be used. Magnetic memories use the property that some magnetic materials retain a high residual magnetism after the exciting current that produced the magnetism is removed. The exciting current can be controlled to magnetize an element of the memory to a selected polarity to represent one of two values in a binary system. Magnetic materials can be switched between their two states of residual magnetism by a familiar but relatively slow process called parallel mode or domain wall switching. Some materials that are formed in thin films can also be switched by a much faster process called orthogonal mode or rotational switching. In rotational switching, two orthogonally positioned conductors are usually used to switch a memory element and these pairs of conductors can be connected in a matrix in which each element is selectable by a unique pair of conductors.

Some orthogonal mode magnetic memories have one of the two conductors made relatively flat with a succession of holes that define the individual memory elements; the conductor is coated with a thin magnetic film that provides a path for circumferential magnetization around each hole and for radial magnetization about the branches of the conductor on either side of each hole. A group of elements that are excited together in one of the orthogonal directions is called a word and the conductor itself is called a word line. Each element has an individual conductor that is operated to sense the change of magnetism that appears in the element when the word line is energized. The direction of this change indicates the binary value that was stored in the element when it was earlier given a circumferential magnetization of a selected polarity; this process is called reading and the line is called a sense line. The sense line can also be operated in cooperation with the word line to give the associated memory element its selected circumferential polarity, a process called writing. As has already been suggested, each sense line can be threaded through a particular element of many different words and a particular word can be selected by energizing the appropriate word line.

One general object of this invention is to provide a new and improved device for energizing a selected word line in a magnetic memory of the type described in the preceding paragraph. A more specific object is to provide a new and improved switch that can be operated at the high speeds that rotational switching provides in thin film memories. Another more specific object of this invention is to provide a new and improved switching device that is constructed to be generally flat so that it can be easily assembled in a plane structure of a thin film memory, more specifically to be constructed as an integral part of the plane. Another more general object of this invention is to provide a new and improved controlled switch that is suitable for various applications illustrated by the magnetic memory that has been described. Another more general object is to provide a new and improved controlled transformer that can be connected in a matrix of such transformers.

In a preferred embodiment of the invention, the switch includes two conductors that are constructed to function as a primary winding and a secondary winding in a region where a hole is formed in each conductor. The two conductors are insulated from each other and are coated with a thin magnetic film. A control conductor is positioned through the holes in the conductors. The film is constructed to be saturated in response to a current pulse in the primary winding and to retain about this value of magnetization when the primary current pulse is removed. Thus the magnetic coupling between the primary and secondary windings is effective for only a single operation; before the device can again function as a transformer the magnetization must be reset to its starting value. The control winding and the primary are operated together to reset the magnetization. All of the switching operations are preferably performed in the rotational mode.

In the preferred embodiment just described, the flat construction of the primary and secondary windings makes the switch particularly suited to a thin film memory, and in a thin film memory the secondary winding can be formed as an integral part of a word line. Because the transformer is controllable, many primary windings can be connected in series and controlled so that only a selected transformer is operable in response to a current pulse in the series circuit.

The following detailed description of a specific embodiment of the invention and several other embodiments will further explain the goals of such a switching device, the problems of achieving these goals in the particular application to a thin film memory, and further objects, advantages and features of this invention.

*The drawing.*—FIG. 1 is an exploded isometric of the controlled transformer of this invention.

Figure 1:
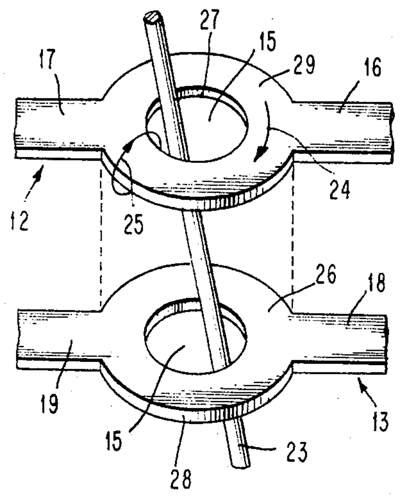

*The switching transformer.*—In the device of FIG. 1, two conductors are constructed to function as a transformer primary winding 12 and secondary winding 13 in a region where a hole 15 is formed in the two conductors. Primary winding 12 has extensions 16, 17 that form the input leads to the transformer and secondary winding 13 has extensions 18, 19 that form the output leads. A control conductor 23 is positioned to extend through hole 15.

With respect to currents in windings 12, 13, hole 15 simply establishes two parallel conductive branches between lead pair 16, 17 and two branches between lead pair 18, 19. The leads are aligned, 16 with 18 and 17 with 19, so that the two windings conduct in parallel directions. Hole 15 and conductor 23 each extend in a direction that is orthogonal to the direction of conduction of windings 12, 13.

A thin magnetic film is arranged to provide a path for circumferential magnetization indicated by arrows 24 in response to current in conductor 23 and to provide a path for radial magnetization indicated by arrows 25 in response to current in windings 12, 13. The film is constructed with its easy direction of magnetization in the radial direction 25. Winding 12 and control conductor 23 cooperate to switch the film in and out of the easy radial direction as will be described later.

The two windings are separated by insulation between their inwardly facing surfaces 26. The outer surfaces 27, 28, 29 are coated with insulation and the magnetic film is formed on the insulation coating. Preferably the two windings and their leads are formed from a double layer copper sheet having an etchable insulation layer between the two copper layers. Various construction techniques that are well known for thin film memories are suitable for the transformer of FIG. 1.

Figure 2:
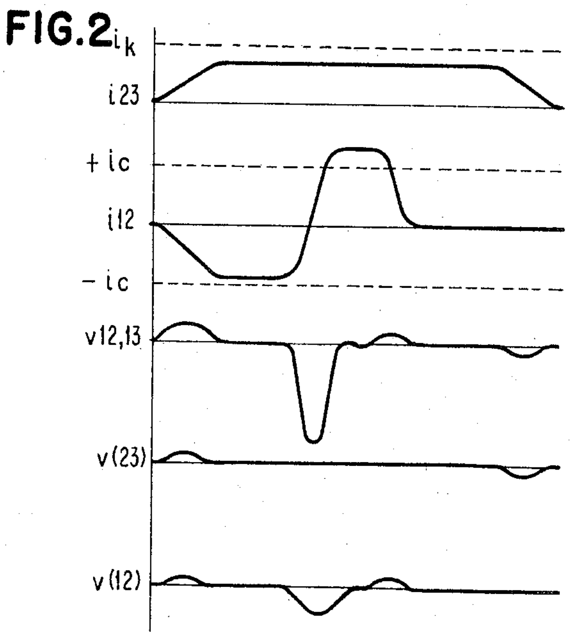
FIG. 2 shows current waveforms that help explain the operation of the transformer of FIG. 1.

*Operation.*—FIG. 2 shows the current and voltage wave forms for an operating sequence in which the transformer is first preset and is then connected to receive a drive pulse. Before considering the operation in the detail of FIG. 2, it will be helpful to consider the general operation of the device as a transformer.

The two windings 12, 13 function as a transformer in response to a pulse in the primary winding in a polarity that will be called read. This pulse saturates the film in the easy direction 24 in a polarity that will be called the usual polarity. Until the film is preset away from its usual magnetization (as will be described later), it retains this saturation magnetization. When a read pulse is applied to a transformer that is already saturated in its usual polarity, the film is simply operated along the generally flat portion of its hysteresis curve in the direction of its existing saturation and there is substantially no inductive voltage across the transformer windings.

If a high amplitude pulse were applied to winding 12 in the opposite polarity (called the write polarity), the magnetization of the film would change to the opposite easy polarity by domain wall switching; the transformer is preferably not operated in this mode and write currents are kept below the value $i_c$ at which the magnetization changes polarity.

In FIG. 2 the wave forms $i_{23}$ and $i_{12}$ show the currents applied to control winding 23 and primary winding 12 and wave form $v_{12,13}$ shows the drive voltage and incidental voltages that appear across the transformer. (The other two wave forms illustrate the matrix operation of FIG. 3.)

To preset the film, conductors 12 and 23 are given appropriate currents to rotationally switch the film away from its easy direction. The specific orientation of the film magnetization is not critical but it is preferably at about the easy radial direction in the polarity opposite to the usual polarity. The amplitudes shown in FIG. 2 relate to the operation in a matrix that will be described later.

While the current in control conductor 23 is maintained, a large fast read current is applied to the primary winding. These currents rotationally switch the film from the preset state to about the usual direction of magnetization. (Until the control current is removed the magnetization has a circumferential component.) As the magnetization changes, a voltage pulse appears across windings 12 and 13. In the circuit of the secondary winding this voltage drives a load connected to leads 18, 19. As the primary current and the control current are removed, the film returns fully to its usual magnetization.

As FIG. 2 shows, the flux changes associated with presetting the film and with removing the primary current and the control current produce voltages across the transformer windings. As the magnetization rotates, a voltage appears across the transformer leads that is proportional to the rate of change of the circumferential component of the magnetization. Such changes occur with each change in current in either winding 23 or winding 12. As FIG. 2 shows, a voltage pulse appears across the transformer windings as the magnetization is rotated from its usual circumferential direction to the preset direction. The presetting currents in conductors 12 and 23 are made to rise slowly enough that the voltage induced in the secondary does not adversely affect the load; when the secondary winding is connected to drive a word line of a magnetic memory (as in FIG. 3) the voltage is kept low enough that only reversible magnetization occurs in the memory elements.

As the read pulse is removed, the magnetization rotates somewhat toward the circumferential direction according to the current in winding 23 and a corresponding voltage appears across the transformer windings. As the current in control conductor 23 is removed, the magnetization returns to the usual direction and another small voltage appears across the windings.

Alternately, the film can be constructed to have a residual magnetism in the circumferential direction; with this construction the control current can be removed at the end of the preset portion of the operating cycle.

The operation just described is useful in many applications for the controlled switching transformer. The application of the transformer in the memory of FIG. 3 leads to a somewhat more specific operation that will be described later.

*An application of the switch in a thin film memory*

Figure 3:
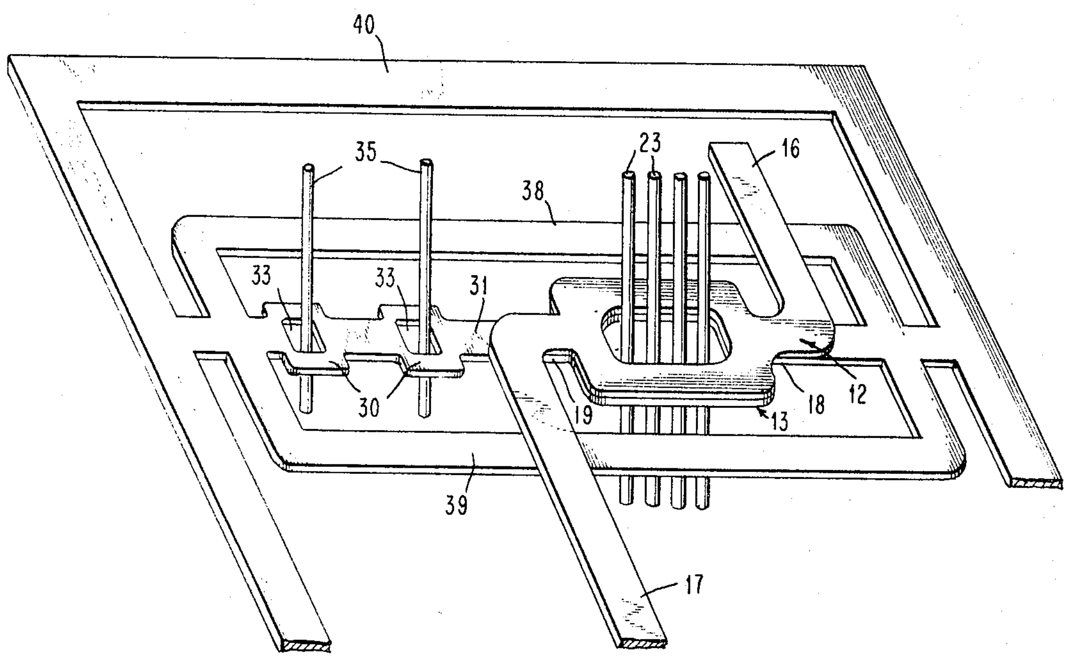
FIG. 3 is an isometric showing the transformer of FIG. 1 constructed as part of a thin film memory.

FIG. 3 shows the switching transformer 12, 13 of FIG. 1 as it is constructed to operate in a thin film memory. Thin film memories are well known and the memory of FIG. 3 will be described only as its features relate to the transformer. The memory has a plurality of elements 30 that are arranged to be excited by a common conductor 31 so that they function as a group called a word. Conductor 31 forms the word line; it is generally flat and has holes 33 that define individual magnetic memory elements 30. A sense line 35 is positioned to link each core 30. The sense lines are connected to circuits that respond to voltages on the lines to read the word represented by the states of the elements and to circuits that establish currents in the lines to write a new word. A thin metal magnetic film is formed on the conductor to provide a path for circumferential magnetization in response to a current on sense line 35 and for radial magnetization in response to current in the two branches of word line 31 in the region of a hole. The film is constructed to have its easy direction of magnetization in the circumferential direction.

A binary value is stored in an element 30 according to the polarity of the circumferential magnetization. When a current pulse is applied to word line 31 the magnetization of elements 30 is rotated from the circumferential direction toward the radial direction and a voltage appears in the associated sense line 35. This voltage has a polarity that corresponds to the polarity of the previous circumferential magnetization and thereby indicates the binary value stored by the core. If the current pulse is kept small, the magnetization returns to its previous circumferential direction after the word current is removed. This operation is called nondestructive read. For a large word current (which produces a larger voltage on conductors 31) the magnetization to which the core returns is indefinite. To write, the word current can be continued while a current is applied to each line 35 to establish the polarity of the circumferential magnetization when the currents are removed.

The secondary winding 13 of the switching transformer is connected to conduct in series with word line 31. Preferably secondary winding 13 and word line 31 are formed from a common sheet of copper.

As FIG. 3 shows, the circuit of secondary winding 12, its leads 18 and 19, and the associated word line are preferably made in part of two branches 38, 39 to better define the stray magnetic field of the device.

The structure of the memory elements, the word line, and the transformer secondary winding are suitably supported so that many similar structures can be formed in the same plane to one side of this structure. In the preferred device shown in FIG. 3 the flat conductor that the structure is formed from is arranged to form a frame 40 around the illustrated word group and to extend so that other similar groups can be formed in the same plane.

Primary winding 12 is positioned to be magnetically coupled to secondary winding 13 as has been described in connection with FIG. 1, and its leads 16, 17 are extended to be connected to a pulse source or to be connected to another primary winding in the same plane. Thus several primary windings are energized in series. A particular word line is selected to be read by presetting the associated transformer. As FIG. 3 shows, the control conductor 23 may be made up of several conductors that are energizable in a pattern to select a particular one of the series connected transformers.

Many of the multiple word planes just described can be stacked one above the other so that several transformers are coupled to the same control conductor or group of control conductors. Each group of series connected primary windings is separately energizable to select a particular one of the planes in which the transformer is to be preset.

*Operation in a matrix.*—In a matrix the individual transformers preferably operate in the way that FIG. 2 illustrates; (an alternate mode will be described later). In a matrix the transformer of FIGS. 1 and 3 is interconnected with other transformers and the currents in conductors 12 and 23 affect other transformers besides the one that is selected. The currents tend to change the residual magnetic state of the unselected transformers and the changes in currents produce voltages across the unselected transformers. In FIG. 2 the voltage $v_{(23)}$ is associated with the current in conductor 23 and appears across the windings of each unselected transformer that is coupled to the specific control conductor or group of conductors 23 of the drawing. Voltage $v_{12}$ is associated with changes in current in primary winding 12 and appears across the windings of unselected transformers connected in series with winding 12. The operation of these unselected transformers and the appropriate operation to suitably minimize the voltages will be described next.

When conductor 23 is given a current for presetting the selected film, it rotates the magnetization of other films that it is coupled to. If the current is kept below a predetermined value $i_k$ this rotation is reversible and the unselected films return to their usual magnetization after the control current is removed. If the current exceeds the value $i_k$, the magnetization takes an undefined state after the current is removed. As FIG. 2 shows, the control current is kept below the value $i_k$; thus the residual magnetism of unselected films coupled to conductor 23 is not changed.

The rotational change in magnetism that occurs in films coupled to conductor 23 produces a voltage in the unselected windings. A similar voltage that occurs in the selected transformer has already been discussed in the description of the isolated transformer of FIG. 1; since the rotation is smaller in the unselected films, the matrix operation does not require any different operation in this respect.

As an alternate embodiment, the group of control conductors 23 in the transformer of FIG. 3 can be arranged so that a unique combination of conductors exists for each transformer. In the selected transformer the conductors conduct in the same direction and provide a suitably high excitation for the film; in unselected transformers the conductors operate in opposition to provide a much lower excitation. With this embodiment the selected transformer can be given an excitation higher than the value $i_k$.

A write current in an unselected transformer drives the film in a direction to reverse the magnetization by domain wall switching; this current is kept below the value $i_c$ at which the magnetization would change. In response to the write current the operating point of the unselected films moves along the saturation line and returns to zero. Because the hysteresis loops have some slope in the saturation region, a small flux change occurs with the write current and a corresponding voltage that appears across the unselected windings is shown in FIG. 2.

In response to a read current the unselected films are driven in the direction of their existing usual magnetization. Even though the read current is above the value $i_c$ the unselected films do not change their existing residual magnetization. Another small voltage appears across the unselected windings when the read pulse is applied. A third small voltage appears as the read pulse is removed.

*Other embodiments.*—Several significant variations of a transformer of FIG. 1 can be formed by assigning the conductors 12, 13 and 23 different functions and by constructing the magnetic film to have either an easy magnetization or a hard magnetization in the radial and circumferential directions. There are six combinations of connections to the conductors 12, 13 and 27. For most applications it is undesirable to have the primary and secondary windings orthogonal and these variations (there are four or them) will not be described in detail. Thus there are two important connections, the connection shown in FIGS. 1 and 3 and a connection in which two conductors 23 form the primary and secondary and a single conductor like 12 or 13 forms the control winding.

The magnetic film can be constructed so that the radial and circumferential directions are either easy or hard directions of magnetization. It is undesirable to have the primary winding operate to produce a hard direction of magnetization because in this situation it would produce the same output regardles of the state of the other axis of magnetization. Thus the combination of two hard axes is unsuitable for a controlled transformer. From the standpoint of operating the transformer in the way described, it is satisfactory to construct the film to have both the radial and circumferential directions easy directions of magnetization. However, such films are difficult to construct. For these reasons, in the control transformer of FIG. 1 and FIG. 3 the radial direction is the easy direction of magnetization and the circumferential is the hard direction of magnetization. In the suggested variation in which the lines 23 form the primary and secondary and the single conductor 12 or 13 forms a control winding, the film is formed to have an easy magnetization in the circumferential direction and a hard magnetization in the radial direction. Of the two transformers that meet the requirements suggested so far, the transformer of FIG. 3 is particularly suited to construction in the flat form for driving the memory elements 30.

Those skilled in the art will recognize various applications for the controlled transformer of this invention and suitable modifications within the spirit of the invention and the scope of the claims.

What is claimed is:

1. A controlled transformer adapted to be arranged in a matrix of similar transformers, comprising two generally flat conductors arranged to conduct in parallel directions as a primary winding and a secondary winding, means insulating said conductors from each other, said conductors having a hole extending therethrough in a direction orthogonal to the direction of conduction in the region of the hole, said primary winding having extensions from the region of said hole adapted for conduction with similar extensions of other transformers in a matrix, a thin magnetic film arranged to provide a path for circumferential magnetization about said hole and for radial magnetization coupling said windings, said film having an easy direction of magnetization in its radial direction and having a saturation level and a residual magnetism level that are about the same, means to provide a predetermined pulse in said primary winding to saturate said film in said easy direction whereby further pulses in said primary winding produce substantially no voltage across said windings, control conductor means extending through said hole and adapted to be extended through corresponding holes of other transformers in a matrix, and means to energize said control conductor in cooperation with said primary winding pulse producing means, to rotationally switch the magnetization of said film away from and toward said easy direction.

2. A controlled transformer according to claim 1 in which said film is constructed to have an excitation value $i_k$ below which only reversible circumferential magnetization changes occur and to be responsive to a control current below said level and a coincident primary current to operate said transformer, whereby unselected transformers coupled to said control conductor means in a matrix do not have their residual magnetization changed.

3. A controlled transformer according to claim 1 in which said film is constructed to have an excitation value $i_c$ below which only irreversible radial magnetization changes occur and to be responsive to a primary current below said level and a coincident control current to operate said transformer whereby unselected transformers coupled to said primary winding do not have their residual magnetism changed.

4. A controlled transformer according to claim 1 in which said film is constructed to have an excitation value $i_c$ below which only reversible radial magnetization changes occur and an excitation value $i_k$ below which only reversible circumferential magnetization occurs and to be responsive to coincident primary currents and control currents below these levels to operate said transformer, whereby unselected transformers coupled to either said control means or said primary winding do not have their residual magnetism changed.

5. A controlled transformer adapted to be arranged in a matrix of similar transformers, comprising two generally flat conductors arranged to conduct in parallel directions as a primary winding and a secondary winding, means insulating said conductors from each other, said conductors having a hole extending therethrough in a direction orthogonal to the direction of conduction, said primary winding having extensions from the region of said hole adapted for conduction with similar extensions of other transformers in a matrix, a thin magnetic film arranged to provide a path for circumferential magnetization about said hole and for radial magnetization coupling said winding, said film having an easy direction of magnetization in its radial direction and having a saturation level and a residual magnetism level that are about the same, control conductor means extending through said hole and adapted to be extended through corresponding holes of other transformers in a matrix, and means to energize said control conductor means and said primary winding to rotationally switch said film away from one polarity of radial saturation and to thereafter energize said primary winding in the opposite polarity to produce a voltage across said windings as the magnetism returns toward said one polarity of radial saturation.

6. A controllable transformer according to claim 5 in which said excitation means produces only current changes in said control conductor means that are slow enough that associated voltages induced in said secondary winding do not adversely affect a load circuit associated with the secondary winding.

7. A thin film memory comprising a plurality of memory elements formed as part of a generally flat word line, a generally flat conductor integral with said word line and forming a circuit with said word line and having a hole formed in a region defining a secondary winding of a transformer, a flat conductor having a hole defining a primary winding, means insulating said windings from each other said windings having their holes aligned, a thin magnetic film arranged to provide paths for radial and circumferential magnetization with respect to said holes and coupling said windings, said radial direction being an easy direction and having a saturation level and residual magnetism level that are substantially equal, control conductor means positioned to extend through said holes, and means to energize said control conductor means and said primary winding to rotationally switch the magnetism of said film away from one polarity of the easy direction and producing thereby a relatively small voltage across said windings and to rotationally switch the magnetism to saturation in said one polarity of the easy direction to produce a relatively large voltage across said winding.

8. A thin film memory according to claim 7 in which said energizing means produces a current waveform in said control conductor means to establish a nondestructive read only current in said word line when the film magnetism is switched away from said one polarity of the easy direction.

References Cited

UNITED STATES PATENTS 3,371,327 2/1968 Anderson et al. ______ 340—174

JAMES W. MOFFITT, *Primary Examiner.*